United States Patent
Feith

(10) Patent No.: US 7,419,194 B2
(45) Date of Patent: Sep. 2, 2008

(54) REMOVABLE FLUSH CAP FOR A MULTI-DIAMETER TUBE COUPLING

(75) Inventor: Raymond P. Feith, Chino Hills, CA (US)

(73) Assignee: Rain Bird Corporation, Azusa, CA (US)

(*) Notice: Subject to any disclaimer, the term of this patent is extended or adjusted under 35 U.S.C. 154(b) by 378 days.

(21) Appl. No.: 10/876,500

(22) Filed: Jun. 25, 2004

(65) Prior Publication Data

US 2005/0285400 A1 Dec. 29, 2005

(51) Int. Cl.
B65D 41/06 (2006.01)
(52) U.S. Cl. .................. 285/901; 220/293; 220/301
(58) Field of Classification Search ............. 285/901; 215/356, 357; 220/293, 296, 301, DIG. 33; 239/106, 107, 203–205, 506, 507
See application file for complete search history.

(56) References Cited

U.S. PATENT DOCUMENTS

| 900,110 | A | * | 10/1908 | Matthias ................. 215/357 |
| 1,973,258 | A | * | 9/1934 | Jensen ................. 220/203.26 |
| 3,181,725 | A | * | 5/1965 | Friedl ..................... 220/293 |
| 3,454,225 | A | * | 7/1969 | Hunter ................... 239/205 |
| 3,633,944 | A | | 1/1972 | Hamburg |
| 3,655,132 | A | * | 4/1972 | Rosic ..................... 239/206 |
| 4,257,629 | A | | 3/1981 | Maple et al. |
| 4,508,369 | A | | 4/1985 | Mode |
| 4,593,943 | A | | 6/1986 | Hama et al. |
| 4,657,286 | A | | 4/1987 | Guest |
| 4,660,803 | A | | 4/1987 | Johnston et al. |
| 4,722,560 | A | | 2/1988 | Guest |
| 4,752,033 | A | | 6/1988 | Groendyke |
| 4,846,506 | A | * | 7/1989 | Bocson et al. ............ 285/4 |
| 4,919,457 | A | | 4/1990 | Moretti |
| 4,946,213 | A | | 8/1990 | Guest |
| 4,963,132 | A | * | 10/1990 | Gibson ................... 604/256 |
| 5,104,150 | A | * | 4/1992 | Bard et al. ............... 285/12 |
| 5,163,618 | A | | 11/1992 | Cordua |
| 5,381,919 | A | * | 1/1995 | Griffin et al. ............ 220/326 |
| 5,779,284 | A | | 7/1998 | Guest |

(Continued)

FOREIGN PATENT DOCUMENTS

GB 2 211 506 A 7/1989

(Continued)

Primary Examiner—James M Hewitt
(74) Attorney, Agent, or Firm—Fitch, Even, Tabin & Flannery

(57) ABSTRACT

A removable flush cap designed for use with an irrigation tube coupling or fitting, to facilitate post-installation flushing of dirt and grit from an irrigation system. The flush cap is particularly designed for use with a tube coupling of the type shown in U.S. Pat. No. 6,988,747 B2, having a plurality of retainer collets each with multiple lock fingers oriented for push-in locked reception of a tube end in engagement with a compliant seal. The flush cap includes a generally cylindrical barrel for sealed slide-fit engagement with the compliant seal within one of the retainer collets, and a recessed groove for snap-fit locked reception of the collet lock fingers. The flush cap further includes a plurality of cams for engaging and releasing the collet lock fingers from the cap groove, upon cap rotation, to permit slide-out cap removal from the retainer collet.

29 Claims, 2 Drawing Sheets

U.S. PATENT DOCUMENTS

| | | | |
|---|---|---|---|
| 5,921,586 A | 7/1999 | Prassas et al. | |
| 5,944,208 A * | 8/1999 | Gale | 215/296 |
| 5,954,372 A | 9/1999 | Moynihan | |
| 6,027,125 A | 2/2000 | Guest | |
| 6,079,584 A * | 6/2000 | Griffin | 220/296 |
| 6,231,090 B1 | 5/2001 | Fukao et al. | |
| 6,299,075 B1 * | 10/2001 | Koller | 239/106 |
| 6,302,451 B1 | 10/2001 | Olson | |
| 6,464,266 B1 | 10/2002 | O'Neill et al. | |
| 6,517,124 B1 | 2/2003 | Le Quere | |
| 6,722,702 B1 | 4/2004 | Min-Cheol | |
| 6,905,040 B2 * | 6/2005 | Hilger et al. | 220/301 |
| 6,988,747 B2 * | 1/2006 | Allen et al. | 285/322 |
| 2001/0035415 A1 * | 11/2001 | Hilger et al. | 220/301 |
| 2004/0240940 A1 | 12/2004 | Ericksen et al. | |

FOREIGN PATENT DOCUMENTS

JP     01-206196     8/1989

* cited by examiner

REMOVABLE FLUSH CAP FOR A MULTI-DIAMETER TUBE COUPLING

BACKGROUND OF THE INVENTION

This invention relates generally to improvements in fluid connectors or couplings of the type used, for example, to interconnect lengths of flexible plastic tubing in a low flow or drip irrigation system or the like. More particularly, this invention relates to a relatively simple flush cap for removable mounting onto an irrigation tube coupling or fitting, wherein the flush cap is adapted for quick and easy removal to permit and facilitate post-installation flushing of undesirable debris such as dirt and grit from an irrigation system.

Drip irrigation systems are well known in the art, wherein a plurality of relatively low flow irrigation devices, emission devices or heads are mounted at selected locations along a length of relatively lightweight, flexible plastic tubing. In such irrigation systems, the tubing is connected to a source or supply of water under suitable pressure for flow to each irrigation head through which the water is dispensed at a low flow rate, typically in a drip fashion, to predetermined sites such as specific plants or vegetation adjacent each irrigation head. To facilitate arrangement of the tubing and associated irrigation heads in the desired configuration, a plurality of tubing connectors or couplings are commonly provided to interconnect lengths of the tubing, wherein such couplings may comprise in-line connectors, elbow fittings, tee fittings, and the like.

In irrigation systems of this general type, the flexible plastic tubing may be provided in different standard diametric sizes, for example, such as 16 mm, 17 mm, and 18 mm outer diameters. In the past, the associated tubing connectors have been designed for dedicated use with a single tubing size, whereby it has been necessary for manufacturers to produce tubing connectors in different sizes for use with different tubing. Moreover, for initial system installation and/or subsequent modification as may be required due to maturing vegetation and/or planting alternations, the customer has been required to obtain and use tubing connectors of the correct size. Unfortunately, tubing connectors of an incorrect size are often used, resulting in faulty connections that leak and waste water, or otherwise deliver irrigation water to undesired locations throughout the irrigation system.

U.S. Pat. No. 6,988,747 B2, which is incorporated by reference herein, discloses an improved irrigation tube coupling or fitting adapted for quick and easy, substantially leak-free interconnection of flexible plastic tubing in an irrigation system, wherein the tubing has a diametric size selected from a range of different standard tubing sizes. However, in this improved tube coupling as well as in prior tube couplings or fittings designed for use with a single tubing size, at least some particulate debris such as dirt and grit can be ingested within an irrigation system including multiple couplings and multiple lengths of irrigation tubing, particularly at the time of initial system installation. Such dirt and grit can be subsequently carried by water under pressure supplied to the irrigation system to the irrigation emission devices where it can become lodged within and clog relatively small outflow ports formed in the irrigation emission devices.

The present invention is specifically directed to an relatively simple and easily manipulated flush cap for removable mounting onto at least one and preferably each of a plurality of tube couplings within an irrigation system, wherein each flush cap is easily removable, e.g., at the conclusion of initial system installation or subsequently on a periodic or as-needed basis, to open a relatively large flow passage for flushing of particulate debris from the system, followed by quick and easy re-mounting of the flush cap in a sealed manner onto the associated tube coupling for resumed normal system operation.

SUMMARY OF THE INVENTION

In accordance with the invention, a removable flush cap is provided for mounting onto an irrigation tube coupling or fitting, to facilitate post-installation flushing of dirt and grit from an irrigation system. The flush cap is particularly designed for use with a tube coupling of the type shown in U.S. Pat No. 6,988,747 B2, having a plurality of retainer collets each with multiple lock fingers oriented for push-in locked reception of a tube end in engagement with a compliant seal. The flush cap is designed for quick and easy, substantially snap-fit and substantially sealed assembly with a selected one of the retainer collets. The flush cap is removable upon part-circle rotation relative to the associated retainer collet, for releasing the collet lock fingers and permitting slide-out disassembly of the flush cap therefrom. Upon such removal, water under pressure supplied to the irrigation system flows freely through the thus-opened retainer collet to flush particulate debris from the system. Following a flush cycle, the flush cap can be quickly and easily re-assembled with the selected retainer collet.

In the preferred form, the flush cap defines a generally cylindrical barrel carrying a closed outboard end wall, and wherein the barrel has a size and shape for slide-fit insertion into a flow passage formed by the selected retainer collet. The barrel engages the compliant seal within said flow passage for preventing water leakage therefrom. The cap barrel further defines a externally circumferentially extending recessed groove at an outboard position relative to the engaged compliant seal, wherein this groove has a size and shape for substantially snap-fit reception of the collet lock fingers to lock the flush cap in assembled relation with the retainer collet. A plurality of cams on the cap barrel are positioned for engaging the collet lock fingers upon part-circle cap rotation, for radially retracting these lock fingers from the cap groove thereby permitting slide-out removal of the flush cap from the retainer collet.

When the flush cap is removed from the associated retainer collet, particulate debris within the irrigation system can be flushed therefrom upon supply of water under pressure thereto, with such debris being flushed outwardly through the now-open collet flow passage. In this manner, particulate debris can be flushed from the system immediately subsequent to initial system installation, or thereafter on an as-needed or periodic basis. At the conclusion of a flush step, the flush cap can be re-installed on the associated retainer collet by simple push-in, substantially snap-fit insertion of the barrel into the collet flow passage.

Other features and advantages of the present invention will become more apparent from the following detailed description taken in conjunction with the accompanying drawings which illustrate, by way of example, the principles of the invention.

DETAILED DESCRIPTION OF THE PREFERRED EMBODIMENT

Figure 1:
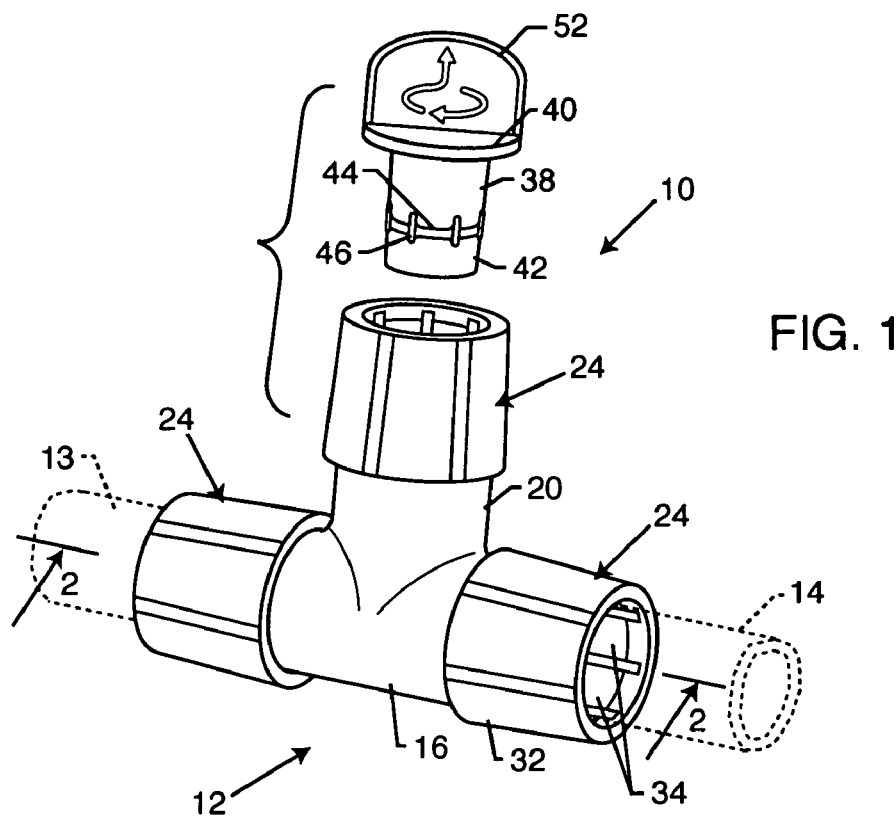
FIG. 1 is a perspective view, shown partially exploded, of a multi-diameter tube coupling in combination with a removable flush cap constructed in accordance with the present invention.

As shown in the exemplary drawings, a flush cap referred to generally by the reference numeral 10 is provided for quick and easy removable mounting onto a tube coupling or fitting 12 of the type designed for interconnecting lengths of flexible plastic tubing 13 and 14 for substantially leak-free flow-through of fluid therebetween, particularly for use in a relatively low flow or drip flow irrigation system. The flush cap 10 is removable from the coupling 12 to permit and facilitate water flow flushing of particulate debris such as dirt and grit from the irrigation system. Following a flush cycle, the flush cap 10 is quickly and easily re-installed on the tube coupling 12 in a relatively simple slide-fit and substantially sealed locked engagement therewith to prevent undesired water leakage.

The tube coupling or fitting 12 of the present invention is particularly designed for use in low flow or drip flow irrigation systems wherein a tubing network (not shown) is constructed from lengths of tubing and a plurality of tubing connectors, with associated irrigation heads (also not shown) mounted on the tubing at appropriate locations for delivering irrigation water at a controlled slow flow rate to specific irrigation sites such as to specific plants or vegetation adjacent each irrigation head. The tubing network is connected to a suitable source or supply of water under pressure (not shown) which flows through the tubing and associated couplings to each irrigation head in the system.

Figure 2:
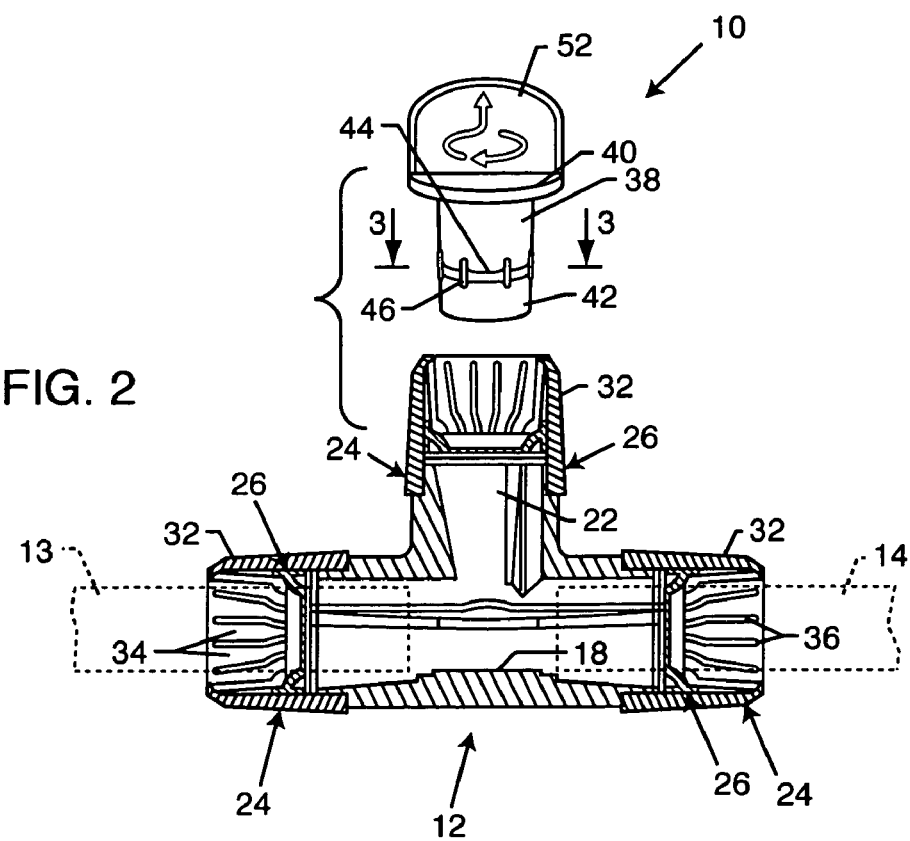
FIG. 2 is a vertical sectional view taken generally on the line 2-2 of FIG. 1.

FIGS. 1-2 depict one preferred tube coupling 12 generally as shown and described in U.S. Pat. No. 6,988,747 B2, which is incorporated by reference herein. This tube coupling 12 is constructed for use with flexible plastic tubing or the like having a diametric size within a range of standard tubing sizes, such as diametric sizes of about 16 mm, 17 mm, and 18 mm, respectively, used commonly for drip irrigation systems. As shown, the tube coupling 12 receives and supports the ends of the tubing 13 and 14 in generally aligned end-to-end relation to define an uninterrupted flow path extending through the coupling 12 from one of tubing lengths to the other.

More particularly, the illustrative tube coupling 12 comprises a tee Fitting to include a generally cylindrical body 16 defining an open primary flow passage 18 (FIG. 2) extending from one end thereof to the other. A generally cylindrical side leg 20 is formed on the body 16 and defines an additional flow Passage 22 which intersects with the primary flow passage 18. A pair of retainer collets 24 each in association with a respective ring-shaped compliant seal member 26 are mounted onto the body 16 at the opposite ends thereof, for facilitated and simple slide-fit locked reception of the tubing ends 13 and 14, respectively. A third retainer collet 24 and associated compliant seal member 26 is mounted onto the side leg 20 for slide-fit locked reception of an additional tubing end as shown and described in U.S. Pat. No. 6,988,747 B2. However, in accordance with the present invention, this third retainer collet 24 removably supports the flush cap 10 whereby the additional flow passage 22 comprises a flush passage as will be described herein in more detail. Alternatively, persons skilled in the art will recognize and appreciate that the tubing ends 13, 14 can be slide-fit connected with any two of the retainer collets 24, and the flush cap 10 removably mounted on the remaining collet 24.

Figure 4:
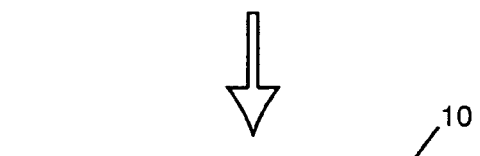
FIG. 4 is an enlarged fragmented perspective view illustrating the flush cap in an installed position within one of a plurality of retainer collets of the multi-diameter tube coupling, with said flush cap positioned in substantially sealed engagement with a compliant seal member within said retainer collet.
Figure 4:
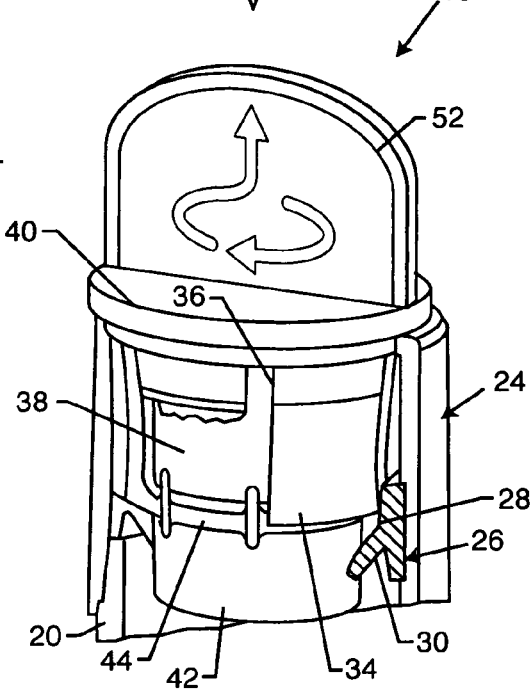

As shown and described in U.S. Pat. No. 6,988,747 B2, the coupling body 16 and associated side leg 20 is conveniently constructed as a unitary molding from a lightweight plastic material. The compliant seal members 26 are formed from a suitable elastomer to include an annular base ring 28 (FIG. 4) in combination with a radially inwardly extending and axially angled pliant seal lip 30. The base ring 28 of each seal member 26 is sized for substantially in-line positioning lining the associated open end of the primary flow passage 18, or at the open end of the flush passage 22, with the seal lip 30 protruding radially inwardly and angling axially in an inboard direction. The base ring 28 of each seal member 26 is axially retained in position between the associated outboard end of the flow passage 18 or flush passage 22, and the associated retainer collet 24 mounted thereon. Importantly, the pliant seal lip 30 of each seal member 26 is adapted to slidably receive and seal against the external surface of tubing, such as the illustrative tubing ends 13 and 14, selected from a range of different standard tubing sizes.

Each retainer collet 24, which may also be conveniently formed from lightweight molded plastic or the like, is designed to capture and retain the seal member 26 at the associated end of the flow path 18 or flush passage 22. In this regard, each retainer collet 24 includes a generally cylindrical outer shell 32 having an internally countersunk leading end for positive seated reception of a matingly stepped outboard end of the body 16 or side leg 20. With this inter-fitting geometry, each retainer collet 24 can be mounted quickly and easily onto the coupling 12 in a predetermined assembled position, preferably by spin welding or the like.

Each retainer collet 24 includes a plurality of integrally formed and radially movable lock fingers 34 to accommodate unidirectional slide-in reception of the end of a length of tubing 13 or 14. These lock fingers 34 have outboard ends joined to the collet shell 32 generally at an outboard end thereof, and project therefrom in an inboard direction in slightly spaced or cantilevered relation radially inwardly from the collet shell 32. The lock fingers 34 are formed in a generally annular array, defined by intervening axially extending slots 36, so that distal ends of the lock fingers 34 can flex in a radial direction to permit slide-fit reception of tubing within a range of different diametric sizes. The illustrative drawings show each retainer collet 24 to include an array of six lock fingers separated by a corresponding array of six intervening slots 36.

As shown (FIG. 2), the lock finger distal ends are axially positioned at The radially inboard sides of the associated seal member base ring 28 to assist in retaining the seal member 26 in position. In addition, as shown and described in more detail in U.S. Pat. No. 6,988,747 B2, these lock finger distal ends include radially in-turned and relatively sharp-edged and arcuate-profiled teeth protruding radially inwardly and extending angularly in an axially inboard direction, wherein these arcuate-profiled teeth are formed on a common diameter which is equal to or slightly less than but closely matches the circular diametric profile of shape of the exterior surface of a length of tubing to be inserted into the coupling 12.

In use, the lengths of tubing 13 and 14 are quickly and easily inserted into the tube coupling 12 to form a substantially leak-free interconnection. Each length of tubing 13, 14 is slidably press-fitted through the associated retainer collet 24 for coaxial slide-fit passage through the toothed lock fingers 34, and further into slide-fit sealed engagement with the associated seal lips 30 of the seal members 26. In this position, each tubing end is effectively assembled with the tube coupling 12 in a locked and sealed manner. Attempted subsequent withdrawal or retraction of either the tubing end from the coupling 12 is resisted by the toothed lock fingers 34 which are biased in a radially inward direction toward a normal unstressed position engaging the exterior surface of the tubing end.

The flush cap 10 is designed for quick and easy slide-fit, substantially sealed assembly with the third retainer collet 24 mounted on the side leg 20 of the tube coupling 12, in generally the same manner as the tubing ends 13, 14 are assembled with the coupling. However, the flush cap 10 is adapted for quick and easy removal from the associated retainer collet 24, thereby opening the associated flush passage 22 for water flow to the exterior of the coupling 12. In a typical irrigation system installation, the flush cap 10 will be assembled with the coupling 12 prior to and/or during initial system installation, but can be removed from the coupling 12 when the installation is completed to permit water-flow flushing of the irrigation system flow lines and flow passages. Multiple couplings 12 in an irrigation system, wherein a plurality of such couplings can be provided with a removable flush cap 10 of the present invention, can thus be opened for water-flow flushing of any ingested particulate debris such as dirt and grit, followed by re-mounting of the flush caps 10 onto their associated tube couplings 12 for normal irrigation system operation. Each flush cap 10 within the irrigation system may be removed for subsequent flush cycles on a regular or as-needed basis.

Figure 3:
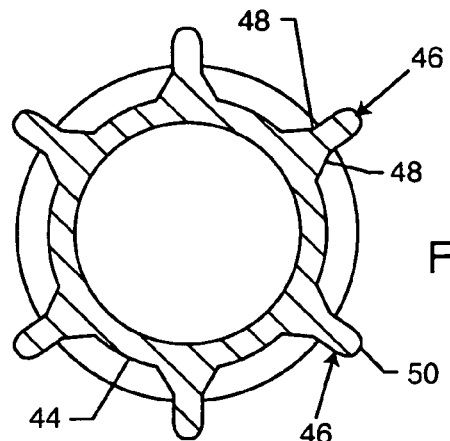
FIG. 3 is a horizontal sectional view taken generally on the line 3-3 of FIG. 2.
Figure 5:
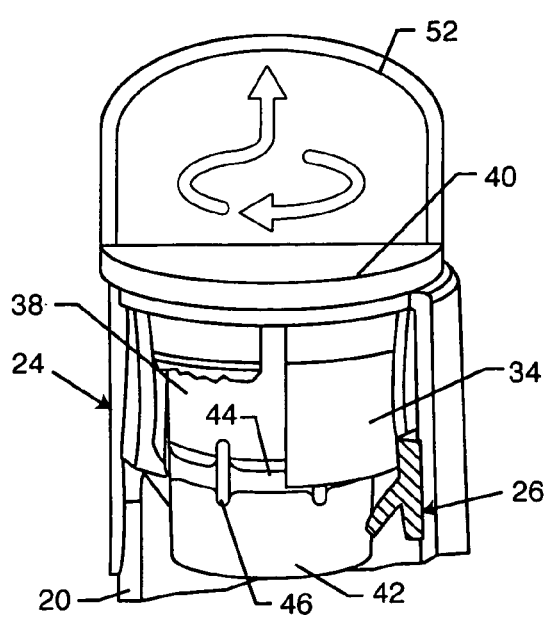
FIG. 5 is an enlarged fragmented sectional view similar to FIG. 4, but showing part-circle rotation of the flush cap relative to the retainer collet for quick and easy slide-out removable therefrom.

The flush cap 10 may also be formed from a lightweight and economical molded plastic or the like, and generally comprises a cylindrical barrel 38 closed such as at an outboard end thereof by a circular end plate or end wall 40 to prevent water flow therethrough. The barrel 38 defines a relatively smooth-surfaced cylindrical nose portion 42 at an inboard or distal end thereof, wherein this nose portion is bordered at an outboard end thereof by a shallow outwardly open or outwardly recessed annular locking groove 44. A plurality of tapered cams 46 (FIGS. 3-5) are formed within this locking groove 44 and generally equiangularly spaced circumferential intervals, with each of said cams 46 defining tapered or ramped side edges 48 extending to an outer tip 50 disposed in radially spaced relation beyond the cylindrical surface of the nose portion 42.

The number, size, and position of the cams 46 on the flush cap 10 are selected so that these cams 46 can fit respectively into the axially elongated slots 36 (shown best in FIG. 4) formed in the associated retainer collet 24 between the locking fingers 34 thereof. With this construction, slide-fit insertion of the flush cap barrel 38 into the open-ended retainer collet 24, with the end wall 40 bearing against an axially outboard face of the retainer collet 24, slidably displaces the recessed barrel groove 44 into axial alignment with the arcuate teeth formed on the distal ends of the locking fingers 34. In this inserted position, appropriate part-circle rotation of the flush cap 10 within the retainer collet 24 aligns the cams 46 with the respective inter-finger slots 36, so that the arcuate teeth on the fingers 34 are free for substantially snap-fit locked reception into the barrel groove 44. An axially outwardly protruding grip tab 52 on the end wall 40 is conveniently provided for facilitated fingertip manual grasping and manipulation of the flush cap 10 for such slide-fit insertion and snap-lock engagement with the retainer collet 24, wherein such snap-lock engagement provided tactile feedback that is readily perceivable by the individual manipulating the grip tab 52. Importantly, in this inserted and locked position, the nose portion 42 of the barrel 38 slidably and sealingly engages the associated seal member 26 to close the flush passage 22 and prevent water outflow or water leakage therefrom.

When desired, the flush cap 10 is quickly and easily removed from the coupling 12 to open the flush passage 22 for water-flow flushing of particulate debris. Such removal is accomplished by initial part-circle rotation of the flush cap 10 in either rotational direction by means of appropriate fingertip manual grasping of the grip tab 52, for rotationally displacing the ramped side edges 48 of the cams 46 against sides of the collet lock fingers 34. The cams 46 thus urge the lock fingers 34 radially outwardly relative to the underlying barrel groove 44, thereby retracting the lock fingers 34 from the groove 44 and permitting slide-out removal of the barrel 38 from the retainer collet 24. With the flush cap 10 thus removed from the coupling 12, water under pressure supplied to the irrigation system will flow relatively freely and at a substantial flow rate through the flush passage 22 to the exterior of the coupling 12, thereby flushing dirt and grit and the like from the system. Upon completion of such flush cycle, the flush cap 10 can be re-installed onto the coupling 12 in the locked and sealed position as previously described, for resumed normal system operation.

A variety of further modifications and improvements in and to a flush cap in accordance with the present invention, and its related assembly with the tube coupling, will be apparent to those persons skilled in the art. Accordingly, no limitation on the invention is intended by way of the foregoing description and accompanying drawings, except as set forth in the appended claims.

What is claimed is:

1. A flush cap for removable mounting onto a tube coupling having a flush passage lined with an annular seal member and at least one radially movable lock finger, said flush cap comprising:

a generally cylindrical barrel sized for slide-fit reception into the tube coupling flush passage;

said barrel having a relatively smooth-surfaced inboard end nose portion with an annular sealing surface for sealing engagement with the seal member, a radially outwardly open locking groove formed in said barrel generally at an outboard end of said nose portion for seated reception of the at least one lock finger to prevent removal of said barrel from the tube coupling, and at least one radially outwardly protruding cam for forming a rotational engagement with the lock finger to retract radially outwardly the at least one tube lock finger from said locking groove upon rotation of said barrel within the flush passage to permit removal of said barrel from the tube coupling;

an end wall on said barrel to prevent water flow therethrough; and a grip tab fixed for rotation with the at least one radially outwardly protruding cam for manual manipulation of said barrel for slide-fit insertion into the flush passage and for rotational displacement within the flush passage.

2. The flush cap of claim 1 wherein said radially outwardly open locking groove comprises an annular recess formed in said barrel.

3. The flush cap of claim 1 wherein said at least one cam extends radially outwardly from said locking groove and defines an outer tip disposed in radially spaced relation beyond said nose portion.

4. The flush cap of claim 3 wherein said at least one cam defines ramped side edges for engaging the at least one lock finger.

5. The flush cap of claim 1 wherein said at least one cam comprises a plurality of cams formed on said barrel at generally equiangularly spaced circumferential intervals.

6. The flush cap of claim 5 wherein each of said plurality of cams extends radially outwardly from said locking groove and defines an outer tip disposed in radially spaced relation beyond said nose portion.

7. The flush cap of claim 6 wherein each of said plurality of cams defines ramped side edges.

8. The flush cap of claim 1 wherein said end wall comprises an outboard end plate on said barrel.

9. The flush cap of claim 1 wherein said grip tab protrudes axially outwardly from said barrel.

10. The flush cap of claim 9 wherein said end wall comprises an outboard end plate on said barrel, and further wherein said grip tab protrudes axially outwardly from said end plate.

11. The flush cap of claim 1 wherein the generally cylindrical barrel has a threadless outer surface.

12. The flush cap of claim 1 wherein the generally cylindrical barrel is closed at the inboard end nose portion to substantially prevent fluid flow therethrough.

13. The flush cap of claim 1 wherein the barrel is configured to rotate in either direction within the flush passage to form the rotational engagement with the lock finger.

14. A flush cap for removable mounting onto a tube coupling having a flush passage lined with an annular seal member and a plurality of radially movable lock fingers supported in a generally annular array and respectively separated from each other by a corresponding plurality of intervening slots, said flush cap comprising:

a generally cylindrical barrel sized for slide-fit reception into the tube coupling flush passage;

said barrel having a relatively smooth-surfaced inboard end nose portion with an annular sealing surface for sealing engagement with the seal member, a radially outwardly open locking groove formed in said barrel generally at an outboard end of said nose portion for seated reception of the lock fingers to prevent removal of said barrel from the tube coupling, and a plurality of radially outwardly protruding cams for forming a rotational engagement with the lock fingers to retract radially outwardly the tube lock fingers from said locking groove upon rotation of said barrel within the flush passage to permit removal of said barrel from the tube coupling;

an end wall on said barrel to prevent water flow therethrough; and a grip tab fixed for rotation with the generally cylindrical barrel for manual manipulation of said barrel for slide-fit insertion into the flush passage and for rotational displacement within the flush passage.

15. The flush cap of claim 14 wherein said radially outwardly open locking groove comprises a shallow annular recess formed in said barrel.

16. The flush cap of claim 14 wherein each of said cams extends radially outwardly from said locking groove and defines ramped side edges and terminates in an outer tip disposed in radially spaced relation beyond said nose portion.

17. The flush cap of claim 14 wherein said plurality of cams are formed on said barrel at generally equiangularly spaced circumferential intervals.

18. The flush cap of claim 14 wherein said cams being formed on said barrel for respective reception into the intervening slots between the lock fingers when the lock fingers are seated within said locking groove, said cams being respectively engageable with said lock fingers upon rotation of said barrel within the flush passage for retracting the lock fingers from said locking groove to permit removal of said flush cap from the flush passage.

19. The flush cap of claim 14 wherein said end wall comprises an outboard end plate on said barrel.

20. The flush cap of claim 14 wherein said grip tab protrudes axially outwardly from said barrel.

21. The flush cap of claim 20 wherein said end wall comprises an outboard end plate on said barrel, and further wherein said grip tab protrudes axially outwardly from said end plate.

22. The flush cap of claim 14 wherein the plurality of radially outwardly protruding cams are spaced circumferentially about the barrel such that part-circle rotation of the barrel in either direction within the flush passage causes the plurality of radially outwardly protruding cams to engage and retract the plurality of radially movable lock fingers.

23. A flush cap for use in combination with a tube coupling having a flush passage lined with an annular seal member and at least one radially movable lock finger, said flush cap comprising:

a generally closed cylindrical barrel having a threadless outer surface sized for slide-fit reception into said tube coupling flush passage;

said barrel having a relatively smooth-surfaced inboard end nose portion for sealing engagement with said seal member, a radially outwardly open locking groove formed in said barrel generally at an outboard end of said nose portion for seated reception of said at least one lock finger to prevent removal of said barrel from said tube coupling, and at least one radially outwardly protruding cam for engaging and retracting said at least one lock finger from said locking groove upon rotation of said barrel within said flush passage to permit removal of said barrel from said tube coupling;

an end wall on said barrel to prevent water flow therethrough;

a grip tab for manual manipulation of said barrel for slide-fit insertion into said flush passage and for rotational displacement within said flush passage; and wherein the at least one radially outwardly protruding cam is fixed relative to the grip tab so that rotation of the grip tab also rotates the at least one radially outwardly protruding cam in the same radial direction.

24. The flush cap of claim 23, wherein the relatively smooth-surfaced inboard end nose portion of the barrel has an annular sealing surface for sealing engagement with the seal member.

25. The flush cap of claim 23, wherein the at least one radially outwardly protruding cam is configured to form a rotational engagement with the lock finger to retract radially outwardly the at least one lock finger.

26. A flush cap for use in combination with a tube coupling having a flush passage lined with an annular seal member and a plurality of radially movable lock fingers supported in a generally annular array and respectively separated from each other by a corresponding plurality of intervening slots, said flush cap comprising:

a generally cylindrical barrel sized for slide-fit reception into said tube coupling flush passage;

said barrel having a relatively smooth-surfaced inboard end nose portion for sealing engagement with said seal member, a radially outwardly open locking groove formed in said barrel generally at an outboard end of said nose portion for seated reception of said lock fingers to prevent removal of said barrel from said tube coupling, and a plurality of radially outwardly protruding cams for engaging and retracting said lock fingers from said locking groove upon part-circle rotation of said barrel in either direction within said flush passage to permit removal of said barrel from said tube coupling;

an end wall on said barrel to prevent water flow therethrough;

a grip tab for manual manipulation of said barrel for slide-fit insertion into said flush passage and for rotational displacement within said flush passage; and wherein the plurality of radially outwardly protruding cams are fixed relative to the grip tab so that rotation of the grip tab also rotates the radially outwardly protruding cams in the same radial direction.

27. The flush cap of claim 26 wherein said cams being formed on said barrel for respective reception into said intervening slots between said lock fingers when said lock fingers are seated within said locking groove, said cams being respectively engageable with said lock fingers upon rotation of said barrel within said flush passage for retracting said lock fingers from said locking groove to permit removal of said flush cap from said flush passage.

28. The flush cap of claim 26, wherein the relatively smooth-surfaced inboard end nose portion of the barrel has an annular sealing surface for sealing engagement with the seal member.

29. The flush cap of claim 26, wherein the plurality of radially outwardly protruding cams are configured to form a rotational engagement with the lock fingers to retract radially outwardly the lock fingers.

* * * * *

UNITED STATES PATENT AND TRADEMARK OFFICE
CERTIFICATE OF CORRECTION

| | | |
|---|---|---|
| PATENT NO. | : 7,419,194 B2 | Page 1 of 1 |
| APPLICATION NO. | : 10/876500 | |
| DATED | : September 2, 2008 | |
| INVENTOR(S) | : Raymond P. Feith | |

It is certified that error appears in the above-identified patent and that said Letters Patent is hereby corrected as shown below:

Column 7, Line 62, delete "a shallow" and insert --an-- therefor.

Signed and Sealed this

Twenty-first Day of April, 2009

JOHN DOLL
*Acting Director of the United States Patent and Trademark Office*